United States Patent
Chiesi

(12) United States Patent (10) Patent No.: US 12,044,578 B2
Chiesi (45) Date of Patent: Jul. 23, 2024

(54) METHOD FOR PROCESSING AN IMAGE

(71) Applicant: Schneider Electric Industries SAS, Rueil-Malmaison (FR)

(72) Inventor: Laurent Chiesi, Reaumont (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 696 days.

(21) Appl. No.: 16/504,441

(22) Filed: Jul. 8, 2019

(65) Prior Publication Data

US 2020/0018652 A1 Jan. 16, 2020

(30) Foreign Application Priority Data

Jul. 10, 2018 (FR) ..................... 18 56355

(51) Int. Cl.
*G01J 5/20* (2006.01)
*G06T 5/70* (2024.01)
*G01J 5/00* (2022.01)

(52) U.S. Cl.
CPC ............. *G01J 5/20* (2013.01); *G06T 5/70* (2024.01); *G01J 2005/0077* (2013.01); *G01J 2005/202* (2013.01); *G06T 2207/10048* (2013.01)

(58) Field of Classification Search
CPC .............. G01J 5/00; G01J 5/20; G06T 5/002
See application file for complete search history.

(56) References Cited

U.S. PATENT DOCUMENTS

| 2002/0074499 | A1  | 6/2002  | Butler   |            |
|--------------|-----|---------|----------|------------|
| 2003/0213910 | A1* | 11/2003 | Anderson | H04N 5/3651 |
|              |     |         |          | 250/338.1  |

(Continued)

FOREIGN PATENT DOCUMENTS

| EP | 2 940 991 A1    | 11/2015 |
|----|-----------------|---------|
| WO | WO 01/84118 A2  | 11/2001 |

OTHER PUBLICATIONS

French Preliminary Search Report issued May 16, 2019 in French Application 18 56355, filed on Jul. 10, 2018 (with English Translation of Categories of Cited Documents).

(Continued)

*Primary Examiner* — David P Porta
*Assistant Examiner* — Shun Lee
(74) *Attorney, Agent, or Firm* — Oblon, McClelland, Maier & Neustadt, L.L.P.

(57) ABSTRACT

The invention relates to a method for processing raw measurements collected by bolometers of a detector, the method comprising:
a) a calculation of masked terms, the calculation consisting in subtracting from the raw measurement of each masked bolometer of a given column the mean value of the raw measurements of the masked bolometers of the said column;
b) a correlation between the masked terms and calibrated components of the masked bolometers, determined according to the relation:

$$S\_mask\_cal\_(i, j) = S\_mask\_ref\_(i, j) - \frac{1}{n}\sum_{k=1}^{n} S\_mask\_ref\_(k, j)$$

the terms being masked bolometer reference measurements obtained at a reference temperature and by masking the detector with a mask;
c) a step of correcting the raw image which comprises the calculation of corrected measurements of a corrected image for each bolometer on the basis of the result of the correlation step b).

11 Claims, 8 Drawing Sheets

(56) References Cited

U.S. PATENT DOCUMENTS

| | | |
|---|---|---|
| 2007/0120058 A1 | 5/2007 | Blackwell et al. |
| 2010/0133438 A1* | 6/2010 | Gardette ................ H04N 5/335 |
| | | 250/341.5 |
| 2010/0237245 A1 | 9/2010 | King et al. |
| 2014/0232875 A1* | 8/2014 | Boulanger ............... H04N 5/33 |
| | | 348/164 |
| 2017/0048473 A1* | 2/2017 | Hall .................... H04N 5/2254 |
| 2017/0205290 A1 | 7/2017 | Kester et al. |
| 2018/0091749 A1* | 3/2018 | Cabib ................... H04N 5/217 |

OTHER PUBLICATIONS

Indian Office Action Issued Jan. 11, 2021 in Indian Patent Application No. 201944026845, 6 pages.

\* cited by examiner

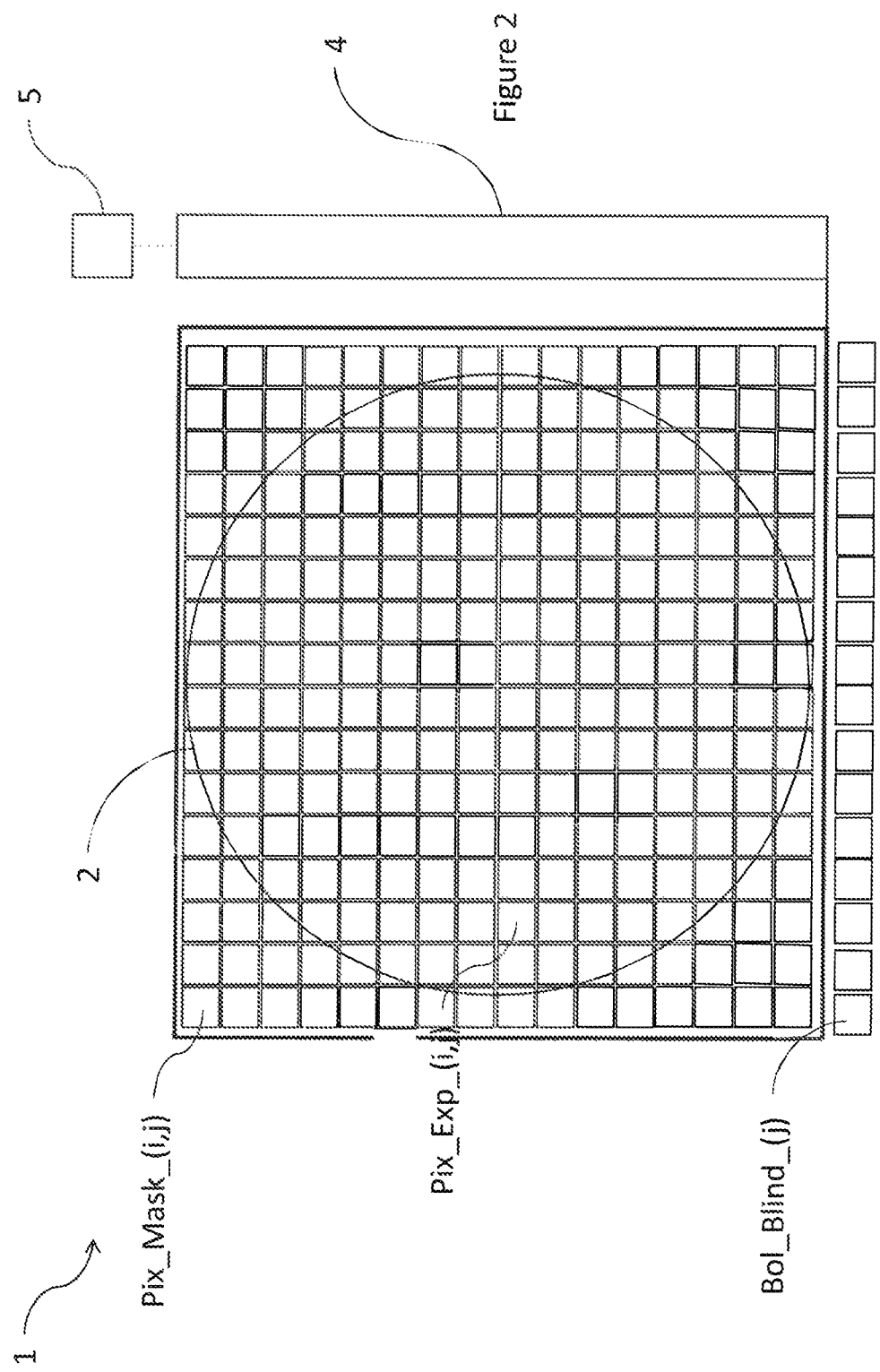

METHOD FOR PROCESSING AN IMAGE

TECHNICAL FIELD

The present invention relates to a method for processing a raw image collected by a detector provided with a matrix of bolometers. In particular, the processing method according to the present invention is intended to correct non-uniformities due to the dispersions of the characteristics of the bolometers of the detector.

The present invention also relates to a computer program able to implement all the steps of the method according to the present invention.

The invention relates finally to a detector comprising bolometers and a calculation unit implementing the computer program.

PRIOR ART

In general, an infrared detector known from the prior art comprises bolometers organized matrix-wise according to n rows and m columns.

When they are exposed to a scene with a view to acquiring an image, these bolometers, sensitive to the temperature of the scene, experience a variation of their electrical resistance. Stated otherwise, the current flowing in each of the bolometers is dependent on the temperature of the scene, and also on the ambient temperature.

In particular, the measurement $S\_(i,j)$ of the bolometers $Pix\_(i,j)$ of a matrix of bolometers evolves according to the following law:

$$Sp(i,j) = \text{Resp}(T_{amb})(T_{scene} - T_{amb}) + S_{0,T_{amb}}$$

where:
- $T_{amb}$ is the ambient temperature, and more particularly the temperature of the imager;
- $T_{scene}$ is the temperature of the scene viewed by the bolometer;
- $\text{Resp}(T_{amb})$ is the bolometer's responsivity, the latter depends on the ambient temperature;
- $S_{0,T_{amb}}$ is the output value of the bolometer for a scene temperature equal to the ambient temperature.

The term $\text{Resp}(T_{amb})$ depends on the materials used for the design of the bolometer as well as the architecture of the latter.

Deduction of the scene temperature requires that the ambient temperature $T_{amb}$ be known, so that the detector is in general also provided with a temperature sensor.

The detector can also be provided with additional bolometers, so-called blind bolometers, which are not exposed to the scene. The current flowing in these then depends only on the ambient temperature.

Thus, according to such a configuration, the determination of the variation of the resistance of an exposed bolometer is based on a differential measurement between the currents flowing in the said exposed bolometer and a blind bolometer.

In general, each column of the matrix of bolometers is associated with a blind bolometer which is implemented for each of the bolometers of the said column during the differential measurement. However, other configurations may be envisaged, and especially the common pooling of a single blind bolometer for several columns of bolometers.

The raw image (FIG. 1) of a scene able to be obtained with such a device is generally not utilizable, and requires additional processing.

In particular, the image illustrated in FIG. 1 reveals the positioning of the bolometers of the detector, and more particularly a non-uniformity ("pixellation effect"). This effect finds its origin in the significant dispersion of the electrical resistances from one bolometer to another.

The image also presents a columnar aspect which is due to the dispersion of the electrical resistances between the blind bolometers.

In order to alleviate these problems, it has been possible to envisage various solutions.

It has been possible, in particular, to propose that a mechanical shutter be implemented on the detector. In particular, the mechanical shutter is placed in front of the detector in such a way as to collect a reference image relating to the ambient temperature, which is subsequently subtracted from the image of the scene.

This arrangement, relatively simple in principle, is however not satisfactory.

Indeed, the implementation of a shutter, and the motorization which is associated therewith, pose both cost and bulkiness problems.

Moreover, the reference image must be refreshed as soon as the ambient temperature varies.

Alternatively, it has been proposed to characterize the temperature response of the detector, and especially of each of its bolometers.

This characterization comprises reference measurements at various temperatures with all the bolometers of the detector being veiled with a shutter.

The reference measurements then make it possible to determine the temperature evolution of each of the bolometers and thus to construct calibration tables kept in a memory space of the detector.

Thus, when operating, the detector corrects the raw image by subtraction, for each bolometer, of the values obtained by interpolation on the basis of the calibration tables.

This solution, which makes it possible to reduce the effect of non-uniformity of the image from one bolometer to another, is however not satisfactory.

Indeed, the procedure for acquiring the reference measurements is lengthy, and generates a cost overhead in the manufacture of the detector.

Moreover, the memory space dedicated to the saving of the calibration tables, on account of the cost associated therewith, is not desirable.

Finally, a third method based on algorithms making it possible to correct the non-uniformity of the image has been proposed in documents [1] and [2] cited at the end of the description.

These methods known from the prior art are not satisfactory either.

Indeed, these methods are generally tedious to implement, and their robustness is arguable.

Moreover, these methods require the implementation of unwieldy calculation means which correspondingly penalize the cost of the detectors in which they are implemented.

An aim of the present invention is to propose a method for processing an image collected by a detector provided with simpler bolometers than the techniques known from the prior art, and not requiring the implementation of mechanical parts as well as the robotization associated therewith.

Another aim of the invention is to propose a method making it possible to correct the columnar effect observed on a raw image.

DISCLOSURE OF THE INVENTION

The aims of the present invention are, at least partly, achieved by a method, executed by a calculation unit, for processing a raw image, characterized by raw measurements S_(i,j) collected by bolometers Pix_(i,j) of a detector and arranged matrix-wise according to n rows and m columns, the bolometers Pix_(i,j) comprising exposed bolometers, and masked bolometers, which are veiled, the method comprising:
a) a calculation of masked terms S_mask_norm_(i,j), associated with the masked bolometers, the calculation consisting in subtracting from the raw measurement S_(i,j) of each masked bolometer of a given column the mean value of the raw measurements S_(i,j) of the masked bolometers of the said column;
b) a correlation between the masked terms S_mask_norm_(i,j) and calibrated components S_mask_cal_(i,j) of the masked bolometers, determined according to the relation:

$$S\_mask\_cal\_(i, j) = S\_mask\_ref\_(i, j) - \frac{1}{n}\sum_{k=1}^{n} S\_mask\_ref\_(k, j)$$

the terms S_mask_ref_(i,j) being masked bolometer reference measurements obtained at a reference temperature and by masking the detector with a mask also maintained at the reference temperature;
c) a step of correcting the raw image which comprises the calculation of corrected measurements S_Cor_(i,j) of a corrected image for each bolometer on the basis of the result of the correlation step b).

According to one mode of implementation, the detector comprises a memory space dedicated to the saving of the calibrated components S_mask_cal_(i,j).

According to one mode of implementation, the correlation step b) comprises a linear regression so that each of the masked terms S_mask_norm_(i,j) and the calibrated components S_mask_cal_(i,j) satisfy the following relation:

$$S\_mask\_norm\_(i,j) = \beta \cdot S\_mask\_cal\_(i,j) + D_{offset}$$

where $\beta$ and $D_{offset}$ are the terms determined during the linear regression.

According to one mode of implementation, the correction step c) comprises the calculation of the corrected measurements S_Cor (i,j) for each bolometer according to the following relation:

$$S\_Cor\_(i,j) = S\_(i,j) - \beta \cdot S\_cal\_(i,j) - D_{offset}$$

where, for a given bolometer, S_cal_(i,j) is a calibrated component determined according to the relation $$S\_cal\_(i, j) = S\_ref\_(i, j) - \frac{1}{n}\sum_{k=1}^{n} S\_ref\_(k, j)$$

the terms S_ref_(i,j) being reference measurements of the bolometers at a reference temperature and by masking the detector with a mask also maintained at the reference temperature.

According to one mode of implementation, the calibrated components S_cal_(i,j) are saved in a memory space of the detector.

According to one mode of implementation, the method furthermore comprises the following steps:
d) a calculation, for each of the columns, of a column term Col_mask_(j) corresponding to the mean value of the measurements S_(i,j) of the masked bolometers of the column considered;
e) a correlation between the column terms Col_mask_(j) and calibrated coordinates C_mask_cal_(j) of the masked bolometers, determined according to the relation:

$$C\_mask\_cal\_(j) = \frac{1}{n}\sum_{k=1}^{n} S\_mask\_ref\_(k, j);$$

f) an additional correction of the corrected image to form a final image, the additional correction comprising
the calculation of final measurements S_fin_(i,j) of the final image on the basis of the corrected measurements S_Cor_(i,j) and on the basis of the result of the correlation step e).

According to one mode of implementation, the correlation step e) comprises a linear regression so that the column terms Col_mask_(j) and the calibrated coordinates C_mask_cal_(j) satisfy the following relation:

$$Col\_mask\_(j) = \alpha \cdot C\_mask\_cal\_(j) + Col_{offset}$$

where $\alpha$ and $Col_{offset}$ are the terms determined during the linear regression.

According to one mode of implementation, the additional correction step f) comprises the calculation of the final measurements S_fin_(i,j) for each bolometer according to the following relation:

$$S\_fin\_(i,j) = S\_Cor\_(i,j) - \alpha \cdot Col\_cal\_(j) - Col_{offset}$$

where, for a bolometer (Pix_(i,j)) of a given column, Col_cal_(i,j) is a calibrated coordinate determined according to the relation $$Col\_cal\_(j) = \frac{1}{n}\sum_{k=1}^{n} S\_ref\_(k, j).$$

According to one mode of implementation, the detector is provided with a lens mounted on a diaphragm which veils bolometers masked at the level of the corners of the detector.

According to one mode of implementation, the detector also comprises blind bolometers, each blind bolometer being implemented for the differential measurement of the bolometers of at least one column of bolometers which is specific thereto, advantageously each blind bolometer is associated with a single column of bolometers.

The invention also relates to a computer program, which, when it is executed by a computer, effects implementation of the method of the present invention.

The invention also relates to a device comprising:
 a detector provided with a plurality of bolometers arranged matrix-wise according to n rows and m columns, the plurality of bolometers comprising exposed bolometers which are exposed to the scene, and masked bolometers which are veiled,
 a calculation unit furnished with the computer program according to the present invention.

The invention also relates to the implementation of the device according to the present invention for detection, especially person detection, in a room.

BRIEF DESCRIPTION OF THE DRAWINGS

Other characteristics and advantages will become apparent in the description which follows of a method for processing an image, which are given by way of nonlimiting examples, with reference to the appended drawings in which:

FIG. 2 is a schematic representation of a detector provided with a lens mounted on a diaphragm able to be implemented according to the present invention;

FIG. 12 illustrates a correction of the columnar aspect solely of the raw image of FIG. 9a.

DETAILED DISCLOSURE OF PARTICULAR EMBODIMENTS

The present invention will now be described in conjunction with FIGS. 1 to 11.

FIG. 2 represents a detector provided with a plurality of bolometers, denoted Pix_(i,j), arranged matrix-wise according to n rows (denoted "$L_i$") and m columns (denoted "$C_j$").

A bolometer indexed i, j corresponds to a bolometer disposed at the intersection of row i with column j.

Among the bolometers Pix_(i,j), it is possible to distinguish the so-called exposed bolometers Pix_Exp_(i,j), exposed to the scene which is intended to be imaged, and the so-called masked bolometers Pix_mask_(i,j), which bolometers are veiled.

The masked bolometers Pix_mask_(i,j) are for example veiled by the diaphragm on which is mounted a lens 2 disposed between the scene and the detector 1. The masked bolometers Pix_mask_(i,j) are, according to this configuration, disposed in the corners of the detector. However, the invention is not limited to this arrangement, and the masked bolometers Pix_mask_(i,j) may for example form complete columns of bolometers, in particular the columns bordering the matrix of bolometers.

The detector of FIG. 2 can also comprise a plurality of blind bolometers Bol_Blind_(j).

The detector 1 furthermore comprises a calculation unit 4 furnished with a calculation processor intended to execute the various steps of the method according to the present invention. The calculation unit can also comprise a memory space for saving raw, reference, or intermediate measurements.

Finally, the detector 1 can comprise a temperature probe 5 intended to evaluate the temperature of the environment in which the said detector is situated.

The temperature probe may, for example, comprise a PN junction.

The method according to the present invention proposes to correct the defects of a raw image collected by the detector 1.

Figure 1:
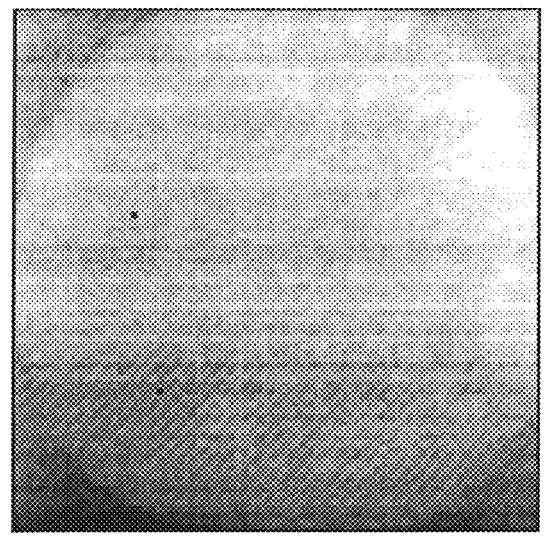
FIG. 1 is a raw image of a scene obtained by a detector provided with bolometers arranged according to a matrix of 80 rows by 80 columns.
Figure 5:
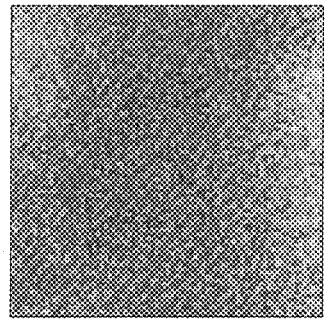
FIG. 5 is a representation of the components of a matrix, a so-called column reference matrix, determined on the basis of the reference image of FIG. 3 and of the vector of FIG. 4.
Figure 4:
FIG. 4 is a representation of the components of a vector, a so-called column reference vector, calculated on the basis of the reference image of FIG. 3.

In this regard FIG. 1, discussed in the section "PRIOR ART", exhibits defects of uniformity and a columnar aspect.

The non-uniformity is due essentially to a dispersion of the electrical resistances of the bolometers forming the detector.

Darker zones can also be observed at the level of the corners of the image. These dark zones are as a result of the veiling of the masked bolometers Pix_mask_(i,j) by the diaphragm on which the lens is mounted, and will be exploited for the correction of the non-uniformities observed on the raw image. The raw measurement S_(i,j) of a masked bolometer Pix_mask_(i,j) is denoted masked raw measurement S_M_(i,j) subsequently in the submission.

A clearer central zone, corresponding to the raw measurements S_(i,j) (denoted exposed raw measurement S_E_(i,j)) of exposed bolometers Pix_Exp_(i,j), can be observed.

Finally, FIG. 1 also reveals a columnar aspect which is due to the dispersion of the electrical resistances of the blind bolometers Bol_Blind_(j). Each blind bolometer Bol_Blind_(j) is, in this regard, implemented for the differential measurement of the bolometers of at least one column of bolometers which is specific thereto, advantageously each blind bolometer Bol_Blind_(j) is associated with a single column $C_j$ of bolometers Pix_(i,j).

Let us note that if all the columns were associated with the same blind bolometer, the columnar effect would not be observed. However, this configuration is not desirable in so far as a failure of this single blind bolometer would render the detector non-operational in its entirety.

The method according to the present invention can comprise the determination of the response S_(i,j), denoted S_ref_(i,j), of the bolometers Pix_(i,j) when they are veiled by a shutter maintained with the detector at a temperature, the so-called reference temperature Tr, for example at 20° C.

Figure 3:
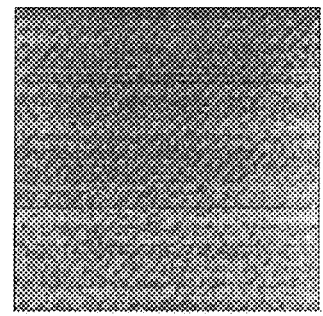
FIG. 3 is a reference image collected by the detector veiled by a shutter maintained with the detector at a reference temperature.
Figure 7:
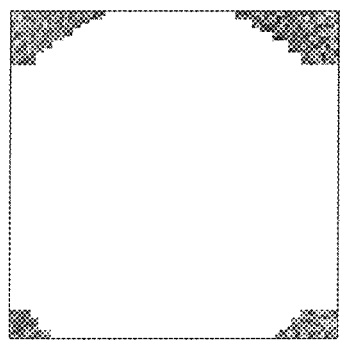
FIG. 7 is a representation of the components of a matrix, a so-called masked reference matrix, determined on the basis of the reference image of FIG. 3 and of the vector of FIG. 6.
Figure 6:
FIG. 6 is a representation of the components of a vector, a so-called masked reference vector, calculated on the basis of the reference image of FIG. 3.

The responses S_Ref_(i,j) can be obtained by a simple measurement by the detector with a shutter placed in front of the bolometers Pix_(i,j). In this regard, FIG. 3 represents a reference image collected by the detector.

On the basis of these reference measurements, a vector, the so-called column reference vector V_ref_col (represented in FIG. 4) with components C_ref_col_(j) (for j ranging from 1 to m), is determined.

The components C_ref_col_(j) are determined by the following relation:

$$C\_ref\_col\_(j) = \frac{1}{n}\sum_{i=1}^{n} S\_ref\_(i, j)$$

Stated otherwise, each component C_ref_col_(j) is the mean of the reference measurements S_Ref_(i,j) of column j.

A matrix, a so-called column reference matrix M_Pix_col_cal (represented in FIG. 5), of calibrated components S_col_cal_(i,j) each associated with a bolometer Pix_(i,j) can also be determined.

The components S_col_cal_(i,j), for each of the bolometers Pix_(i,j) of column j, are then calculated in the following manner:

$$S\_col\_cal\_(i,j) = S\_ref\_(i,j) - C\_ref\_col\_(j) \quad 5$$

Stated otherwise, the calibrated component S_col_cal_(i,j) of a bolometer Pix_(i,j) of a column j of the detector corresponds to the said bolometer's reference measurement from which is subtracted the mean of the reference measurements S_ref_(i,j) of all the bolometers of column j.

The columnar calibration matrix M_Pix_col_cal, such as described subsequently in the submission, is advantageously implemented to correct the columnar aspect of the raw images collected by the detector.

Complementarily or alternatively, still on the basis of the reference measurements S_ref_(i,j), a vector, the so-called masked reference vector V_ref_pix (represented in FIG. 6), with components C_mask_cal_(j), can be determined.

The components C_mask_cal_(j) are determined by the following relation:

$$C\_mask\_cal\_(j) = \frac{1}{n}\sum_{i=1}^{n} S\_mask\_ref\_(i,j)$$

where the data S_mask_ref_(i,j) correspond to the responses S_Ref_(i,j) of the masked bolometers Pix_mask_(i,j) alone.

Stated otherwise, each component C_mask_cal_(j) is the mean of the reference measurements S_Ref_(i,j) associated with the masked bolometers of column j.

A matrix, the so-called masked reference matrix M_Pix_mask_cal (represented in FIG. 7), with components S_mask_cal_(i,j) each associated with a masked bolometer Pix_mask_(i,j), can also be determined.

The calibrated component S_mask_cal_(i,j), for each of the masked bolometers Pix_mask_(i,j) of column j, is determined according to:

$$S\_mask\_cal\_(i,j) = S\_mask\_ref\_(i,j) - C\_mask\_cal\_(j)$$

Stated otherwise, the calibrated component S_mask_cal_(i,j) of a bolometer Pix_mask_(i,j) of a column j of the detector corresponds to the reference measurement of the said bolometer from which is subtracted the mean of the reference measurements of all the masked bolometers of column j.

The establishment of the masked calibration matrix M_Pix_mask_cal and columnar calibration matrix M_Pix_col_cal is implemented during the manufacture of the detector, and their components are advantageously saved in a dedicated memory space of the detector, for example in the memory space of the calculation unit 4.

The method according to the present invention comprises a step a) of calculating terms, the so-called masked terms S_mask_norm_(i,j), of a matrix, the so-called masked matrix.

In particular, each masked term S_mask_norm_(i,j) is associated with a masked bolometer Pix_mask_(i,j).

The determination of the masked term S_mask_norm_(i,j) relating to a masked bolometer Pix_mask_(i,j) of column Cj comprises the subtraction of the mean of the masked raw measurements of column Cj (denoted S_M_(j)) from the masked raw measurement S_M_(i,j).

In particular, each masked term S_mask_norm_(i,j) of column j is determined according to the following relations:

$$S\_M\_(j) = \frac{1}{n}\sum_{k=1}^{n} S\_M\_(k,j)$$

$$S\_mask\_norm\_(i,j) = S\_M\_(i,j) - S\_M\_(j)$$

The step of determining the masked terms S_mask_norm_(i,j) is followed by a step b) of correlating between the said masked terms S_mask_norm_(i,j) and the masked calibrated components S_mask_cal_(i,j) of the masked bolometers Pix_mask_(i,j).

Figure 8:
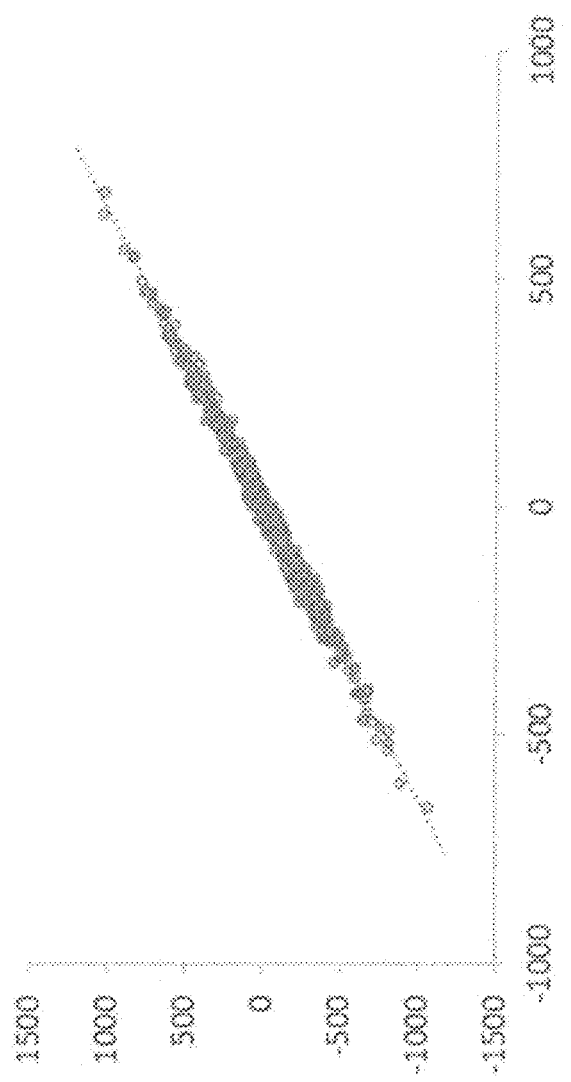
FIG. 8 is a graphical representation of the values of the masked terms S_mask_norm_(i,j) (on the vertical axis) as a function of the masked calibrated components S_mask_cal_(i,j) (horizontal axis)

FIG. 8 represents in particular for each masked bolometer Pix_mask_(i,j) the value of the masked terms S_mask_norm_(i,j) (on the vertical axis) as a function of the masked calibrated components S_mask_cal_(i,j). In this figure, the masked term S_mask_norm_(i,j) varies linearly as a function of the masked calibrated component S_mask_cal_(i,j).

Correlation between these two terms can then comprise a linear regression according to the relation:

$$S\_mask\_norm\_(i,j) = \beta \cdot S\_mask\_cal\_(i,j) + D_{\textit{offset}}$$

where $\beta$ and $D_{\textit{offset}}$ are the terms determined during the linear regression.

These then make it possible to correct, during a correction step c), the raw measurements S_(i,j) of each bolometer according to the relation:

$$S\_Cor\_(i,j) = S\_(i,j) - \beta \cdot S\_col\_cal\_(i,j) - D_{\textit{offset}}$$

Figure 9B:
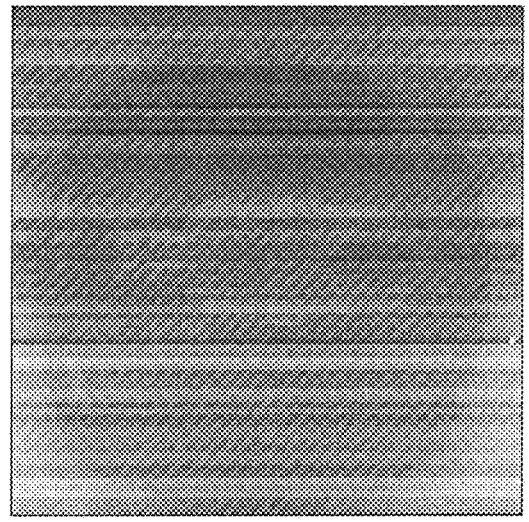
FIGS. 9a and 9b are images, respectively, raw and corrected uniformity-wise according to the present invention.
Figure 9A:
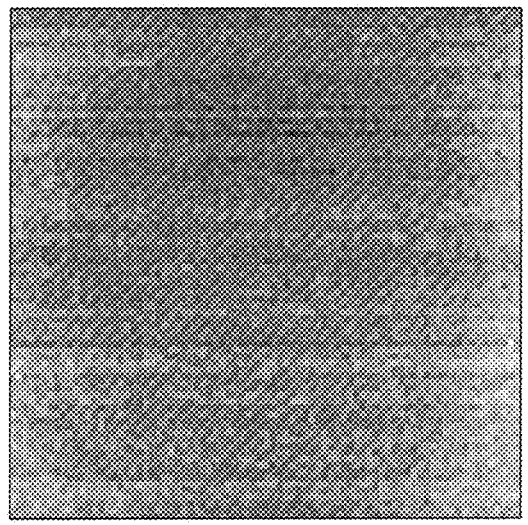

FIGS. 9a and 9b represent the effect of the correction described hereinabove. In particular, FIG. 5a is a raw image, while FIG. 5b illustrates the effect of a correction of non-uniformity of the image. Though the columnar aspect is still apparent in FIG. 5b, the latter affords a glimpse of a person who was hitherto undetectable on the raw image.

The method according to the present invention can also implement a correction of the columnar aspect. The latter can be executed independently to the uniformity correction presented hereinabove.

The method according to the present invention can comprise furthermore, during a step d), a calculation, for each of the columns Cj, of a column term Col_mask_(j) corresponding to the mean value of the measurements S_(i,j) of the masked bolometers Pix_mask_(i,j) of the column considered.

These column terms Col_mask_(j) can then be correlated, during a step e), with the calibrated coordinates C_mask_cal_(j) of the masked bolometers Pix_mask_(i,j).

Figure 10:
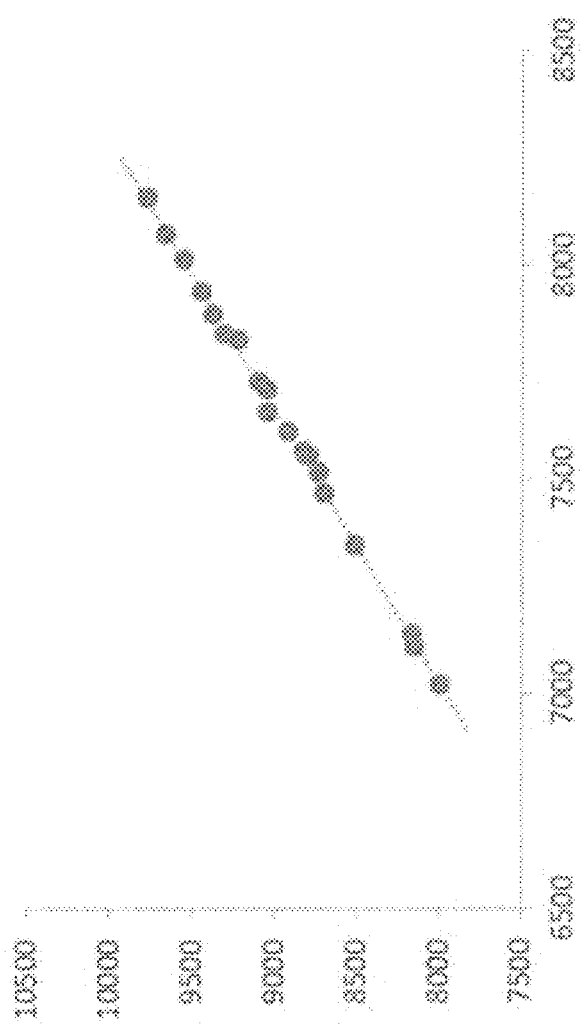
FIG. 10 is a graphical representation of the values of the masked term C_mask_norm_(i,j) (on the vertical axis) as a function of the masked calibrated component C_mask_cal_(i,j)

FIG. 10 represents, in particular for each masked bolometer Pix_mask_(i,j), the value of the column terms Col_mask_(j) (on the vertical axis) as a function of the calibrated coordinates C_mask_cal_(j) of the masked bolometers Pix_mask_(i,j) of column j. In this figure, the term Col_mask_(j) varies linearly as a function of the calibrated coordinate C_mask_cal_(j).

The correlation can comprise a linear regression such that the column terms Col_mask_(j) and the calibrated coordinates C_mask_cal_(j) satisfy the following relation:

$$Col\_mask\_(j) = \alpha \cdot C\_mask\_cal\_(j) + Col_{\textit{offset}}$$

where $\alpha$ and $Col_{\textit{offset}}$ are the terms determined during the linear regression.

The method according to the present invention can then comprise an additional correction (step f) of the corrected image to form a final image.

The additional correction comprises in particular the calculation of final measurements S_fin_(i,j) of the final image on the basis of the corrected measurements S_Cor_(i,j) and on the basis of the result of the correlation step.

For example, the additional correction comprises the calculation of the final measurements S_fin_(i,j) for each bolometer Pix_(i,j) according to the following relation:

$$S\_fin\_(i,j) = S\_Cor\_(i,j) - \alpha \cdot Col\_cal\_(j) - Col_{offset}$$

Figure 11:
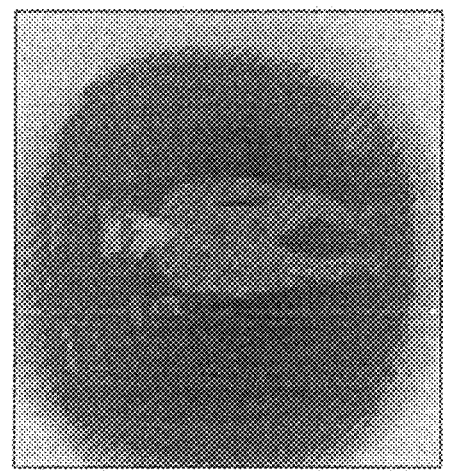
FIG. 11 represents a final image.

The image thus corrected presented in FIG. 11 no longer presents the columnar aspect.

It is understood that the columnar and non-uniformity aspects of the raw image have distinct origins and can consequently be corrected independently.

In particular, the order of implementation of these corrections can be inverted.

Figure 12:
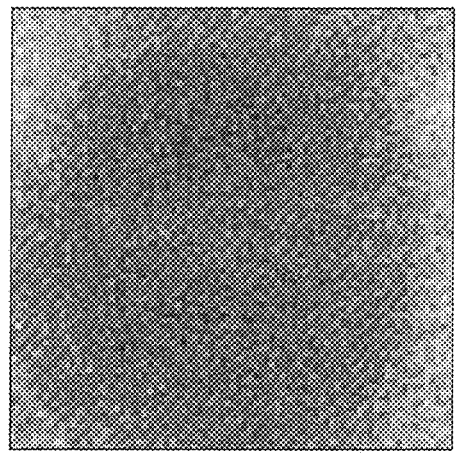

In this regard, FIG. 12 illustrates a correction of the columnar aspect solely of the raw image of FIG. 9a.

The invention also relates to a computer program, which, when it is executed by a computer or a calculation unit, effects implementation of the method according to the present invention.

The present invention makes it possible to correct in a differentiated manner the columnar and non-uniformity aspects of the raw images of the detectors, provided with a matrix of bolometers.

In particular, the present invention requires only a reference measurement at a reference temperature in order to correct the raw images.

The present invention can advantageously be implemented for detection, and especially the detection of people, in rooms.

REFERENCES

[1] EP2940991B1
[2] US2010237245A1

The invention claimed is:

1. A method, executed by a calculation unit, for processing a raw image, having raw measurements S_(i,j) collected by bolometers Pix_(i,j) of a detector and arranged matrix-wise according to n rows ($L_i$) and m columns ($C_j$), the bolometers Pix_(i,j) including exposed bolometers (Pix_exp_(i,j)), and masked bolometers (Pix_mask_(i,j)), which are veiled, the method comprising:

a) calculating masked terms S_mask_norm_(i,j), associated with the masked bolometers (Pix_mask_(i,j)), the calculating consisting in subtracting from the raw measurement S_(i,j) of each masked bolometer (Pix_mask_(i,j)) of a given column ($C_j$) a mean value of the raw measurements S_(i,j) of the masked bolometers of the said column;

b) correlating between the masked terms S_mask_norm_(i,j) and calibrated components S_mask_cal_(i,j) of the masked bolometers (Pix_mask_(i,j)), the calibrated components determined according to relation:

$$S\_mask\_cal\_(i, j) = S\_mask\_ref\_(i, j) - \frac{1}{n}\sum_{k=1}^{n} S\_mask\_ref\_(k, j)$$

terms S_mask_ref_(i,j) being masked bolometer reference measurements (Pix_mask_(i,j)) obtained at a reference temperature (Tr) and by masking the detector with a mask also maintained at the reference temperature (Tr); and c) correcting the raw image which includes calculation of corrected measurements S_Cor_(i,j) of a corrected image for each bolometer (Pix_(i,j)) on the basis of the result of the correlating, wherein the correlating including a linear regression so that each of the masked terms S_mask_norm_(i,j) and the calibrated components S_mask_cal_(i,j) satisfy the following relation:

$$S\_mask\_norm\_(i,j) = \beta \cdot S\_mask\_cal\_(i,j) + D_{offset}$$

where $\beta$ and $D_{offset}$ are the terms determined during the linear regression.

2. The method according to claim 1, wherein the detector includes a memory space dedicated to saving of the calibrated components S_mask_cal_(i,j).

3. The method according to claim 1, wherein the correcting including the calculation of the corrected measurements S_Cor_(i,j) for each bolometer (Pix_(i,j)) according to the following relation:

$$S\_Cor\_(i,j) = S\_(i,j) - \beta \cdot S\_col\_cal\_(i,j) - D_{offset}$$

where, for a given bolometer (Pix_(i,j)), S_cal_(i,j) is a calibrated component determined according to relation $$S\_cal\_(i, j) = S\_ref\_(i, j) - \frac{1}{n}\sum_{k=1}^{n} S\_ref\_(k, j)$$

the terms S_ref_(i,j) being reference measurements of the bolometers (Pix_(i,j)) at a reference temperature (Tr) and by masking the detector with a mask also maintained at the reference temperature (Tr).

4. The method according to claim 3, wherein the calibrated components S_cal_(i,j) are saved in a memory space of the detector.

5. The method according to claim 3, wherein the method furthermore comprises:

d) calculating, for each of the columns (Cj), of a column term Col_mask_(j) corresponding to the mean value of the measurements S_(i,j) of the masked bolometers Pix_mask_(i,j) of the column considered;

e) correlating between the column terms Col_mask_(j) and calibrated coordinates C_mask_cal_(j) of the masked bolometers (Pix_mask_(i,j)), determined according to the relation:

$$C\_mask\_cal\_(j) = \frac{1}{n}\sum_{k=1}^{n} S\_mask\_ref\_(k, j);$$

f) additionally correcting the corrected image to form a final image, the additionally correcting including calculating final measurements S_fin_(i,j) of the final image on the basis of the corrected measurements S_Cor_(i,j) and on the basis of the result of the correlating step e).

6. The method according to claim 5, wherein the correlating step e) includes a linear regression so that the column terms Col_mask_(j) and the calibrated coordinates C_mask_cal_(j) satisfy the following relation:

$$Col\_mask\_(j) = \alpha \cdot C\_mask\_cal\_(j) + Col_{offset}$$

where $\alpha$ and $Col_{offset}$ are the terms determined during the linear regression.

7. The method according to claim 6, wherein the additionally correcting step f) includes the calculation of the final measurements S_fin_(i,j) for each bolometer (Pix_(i,j)) according to the following relation:

$$S\_fin\_(i,j) = S\_Cor\_(i,j) - \alpha \cdot Col\_cal\_(j) - Col_{offset}$$

where, for a bolometer (Pix_(i,j)) of a given column (Cj), Col_cal_(i,j) is a calibrated coordinate determined according to relation $$Col\_cal\_(j) = \frac{1}{n}\sum_{k=1}^{n} S\_ref\_(k,j).$$

8. The method according to one of claim 1, wherein the detector is provided with a lens mounted on a diaphragm which veils masked bolometers (Pix_mask_(i,j)) at a level of corners of the detector.

9. The method according to one of claim 1, wherein the detector also includes blind bolometers (Bol_Blind_(j)), each blind bolometer (Bol_Blind_(i)) being implemented for differential measurement of bolometers of at least one column of bolometers which is specific thereto, each blind bolometer (Bol_Blind_(j)) is associated with a single column ($C_j$) of bolometers (Pix_(i,j)).

10. A non-transitory computer readable medium having stored thereon a program, which, when it is executed by a computer, effects implementation of the method according to claim 1.

11. A device comprising:
a detector provided with a plurality of bolometers arranged matrix-wise according to n rows ($L_i$) and m columns ($C_j$), the plurality of bolometers comprising exposed bolometers (Pix_exp_(i,j)) which are exposed to a scene, and masked bolometers (Pix_mask_(i,j)) which are veiled; and
a processor connected to a non-transitory computer readable medium having stored thereon a program for processing a raw image, having raw measurements S_(i,j) collected by bolometers Pix_(i,j) of a detector, which, when it is executed by a computer causes the processor to be configured to:
a) calculate masked terms S_mask_norm_(i,j), associated with the masked bolometers (Pix_mask_(i,j)), the calculating consisting in subtracting from the raw measurement S_(i,j) of each masked bolometer (Pix_mask_(i,j)) of a given column ($C_j$) mean value of the raw measurements S_(i,j) of the masked bolometers of the said column;
b) correlate between the masked terms S_mask_norm_(i,j) and calibrated components S_mask_cal_(i,j) of the masked bolometers (Pix_mask_(i,j)) the calibrated components determined according to relation:

$$S\_mask\_cal\_(i,j) = S\_mask\_ref\_(i,j) - \frac{1}{n}\sum_{k=1}^{n} S\_mask\_ref\_(k,j)$$

terms S_mask_ref_(i,j) being masked bolometer reference measurements (Pix_mask_(i,j)) obtained at a reference temperature (Tr) and by masking the detector with a mask also maintained at the reference temperature (Tr); and
c) correct the raw image which includes calculation of corrected measurements S_Cor_(i,j) of a corrected image for each bolometer (Pix_(i,j)) on the basis of the result of the correlating,
wherein the processor is further configured to correlate by being configured to perform a linear regression so that each of the masked terms S_mask_norm_(i,j) and the calibrated components S_mask_cal_(i,j) satisfy the following relation:

$$S\_mask\_norm\_(i,j) = \beta \cdot S\_mask\_cal\_(i,j) + D_{offset}$$

where $\beta$ and $D_{offset}$ are the terms determined during the linear regression.

* * * * *